United States Patent

Smith

[11] Patent Number: 5,322,236
[45] Date of Patent: Jun. 21, 1994

[54] FISHING LINE SPOOL HOLDER

[76] Inventor: Ronnie L. Smith, Rte. 2, Box 16-A, Sullivan Rd., Thomasville, N.C. 27360

[21] Appl. No.: 899,890

[22] Filed: Jun. 17, 1992

[51] Int. Cl.5 .................. B65H 59/16; B05C 3/12
[52] U.S. Cl. .................. 242/129.8; 242/156; 118/420; 118/DIG. 19
[58] Field of Search .............. 118/36, 234, 235, 325, 118/400, 420, 428, DIG. 19; 242/129.8, 156, 129.5, 99; 28/217, 247; 57/7, 295; 101/172; 184/15.1, 15.2, 15.3, 16, 17

[56] References Cited

U.S. PATENT DOCUMENTS

| 470,000 | 3/1892 | Hopkins | 118/DIG. 19 |
| 1,074,553 | 9/1913 | Maitland | 242/156 |
| 1,321,977 | 11/1919 | Burg | 118/420 |
| 1,364,259 | 1/1921 | Eaton | 242/156 |
| 1,766,954 | 6/1930 | Scholler | 118/420 |
| 1,810,007 | 6/1931 | Fischer | 118/420 |
| 2,012,176 | 8/1935 | Tevander | 118/420 |
| 2,488,492 | 11/1949 | Dumbleton | 242/156 |
| 3,638,878 | 2/1972 | Morris | 242/129.8 |
| 4,360,172 | 11/1982 | Cope | 242/129.8 |
| 4,948,059 | 8/1990 | Lewitt | 242/156 |
| 5,209,423 | 5/1993 | Barginear | 242/156 |

FOREIGN PATENT DOCUMENTS 1373152  8/1963  France .

Primary Examiner—W. Gary Jones
Assistant Examiner—Steven P. Griffin
Attorney, Agent, or Firm—S. Michael Bender

[57] ABSTRACT

A holder attached to a base member comprises an upright post and a multiplicity of rod extensions orthogonally supported on the post. A different spool of fishing line is mounted for rotation on each rod extension. Adjustable tensioning means are provided on each rod extension engaging a corresponding spool to vary the tension in the fishing line as the spool is rotated on each rod extension thereby permitting selection of the tension of the fishing line as it is wound from the spool to a fishing reel. Attachment means are provided for rendering the base member stationary on a flat supporting surface. In addition, the base member includes means for applying fish scent to the line as it is withdrawn from a selected spool, and cutting means for severing the fishing line after it is wound from each spool.

2 Claims, 4 Drawing Sheets

FISHING LINE SPOOL HOLDER

BACKGROUND OF THE INVENTION

1. Field of the Invention

The present invention relates generally to spool holders and more particularly, to a holder for a multiple array of spools carrying fishing line.

2. Description of the Prior Art

Devices for holding a spool of fishing line so that the line may conveniently be wound from the spool to a fishing rod or reel are known. One such device is disclosed in U.S. Pat. No. 4,316,588 and comprises a U-shaped frame attached to a support surface via a suction cup. The arms of the U-shaped frame are resiliently biased relative to each other to provide support sufficient to hold a supply spool of fishing line while permitting rotation of the spool between the arms.

Other devices are known which permit fishing line to be fed directly from a supply spool to the reel on a fishing rod, i.e. the spool is mounted in one way or another on the fishing rod. Examples of this type of spool holder are disclosed in U.S. Pat. Nos. 4,776,527 and 4,922,644.

Other spool holder devices are disclosed in U.S. Pat. Nos. 4,831,771 (multiple spool for storing large fishing lures) and 4,958,784 (collapsible frame for a single fishing line spool).

While the foregoing devices generally avoid the need of having one person hold the supply reel for rotation on say, a pencil or a stick, while another person operates the reel of the fishing rod to which the line is being transferred, they each suffer from certain disadvantages. For example, it would be desirable to have a fishing line spool holder wherein a multiplicity of spools are provided each having a fishing line thereon of different strength or "pound test." In addition, it would be advantageous if the rotation resistance or "drag" of the supply spool were variable so as to select and apply the desired tension in the line being transferred from the spool to the fishing reel. Still further, it would be desirable if a fishing scent could be automatically transferred to the line as it is unwound from the fishing line spool. None of these advantageous features are believed to be included, either singly or collectively, in the devices of the prior art described above. They are, however, along with yet other advantageous features, contained in the invention disclosed and claimed herein.

SUMMARY OF THE INVENTION

Briefly described, the fishing line spool holder of the present invention comprises a base member, a post member extending from and attached to the base member, and a multiplicity of rod extensions attached to the post member each of which is adapted to support for rotation about its central rotation axis a conventional supply spool of fishing line. Each rod extension includes variable tensioning means for adjusting the rotational resistance of each spool (i.e. its "drag") as the fishing line thereon is unwound. Thus, the tension of the fishing line as it is transferred from the spool to say, a reel on a fishing rod may be selected within a range. Attachment means are provided for affixing the base member to a supporting stationary surface. In one form, the attachment means comprises a suction cup whereas in an alternatively preferred form the attachment means comprises a clamp. Finally, the base member is provided with a tray for automatically applying fish scent to the line as it is unwound from a spool, and a cutting device for cutting the line after a sufficient length has been taken up onto a fishing reel or the like.

The above brief description sets forth rather broadly the more important features of the present invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least three embodiments of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention of the application, which only is measured by the claims, nor is it intended to be limiting as to the scope of the invention in any way.

It is therefore an object of the present invention to provide a new and improved fishing line spool holder which has all the advantages of the prior art and none of the disadvantages thereof.

It is another object of the present invention to provide a new and improved fishing line spool holder which may be easily and efficiently manufactured and marketed.

It is a further object of the present invention to provide a new and improved fishing line spool holder which is of a durable and reliable construction.

An even further object of the present invention is to provide a new and improved fishing line spool holder which is susceptible of a low cost of manufacture with regard to both materials and labor, and which accordingly is then susceptible of low prices of sale to the consuming public, thereby making such fishing line spool holder economically available to the buying public.

Still yet another object of the present invention is to provide a new and improved fishing line spool holder which provides in the apparatuses and methods of the prior art some of the advantages thereof, while simultaneously overcoming some of the disadvantages normally associated therewith.

Still another object of the present invention is to provide a new and improved holder for multiple spools of fishing line wherein each of the spools contains fishing line of a different size or strength.

Yet still another object of the present invention is to provide a fishing line spool holder having means for adjusting the drag resistance of the supply reel as it is unwound.

Yet still another object of the present invention is to provide a fishing line spool holder having means for automatically applying fish scent to the line on a spool being unwound, and means for severing the line after a predetermined length thereof has been unwound.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had now to the accompanying drawings and descriptive matter in which there are illustrated preferred embodiments of the invention.

BRIEF DESCRIPTION OF THE DRAWINGS

The invention will be better understood and the above objects as well as objects other than those set forth above, will become apparent when consideration is given to the following detailed description thereof. Such description makes reference to the annexed drawings wherein.

DESCRIPTION OF THE PREFERRED EMBODIMENT

With reference now to the drawings, a new and improved holder for multiple spools of fishing line embodying the principles and concepts of the present invention will be described.

Figure 1:
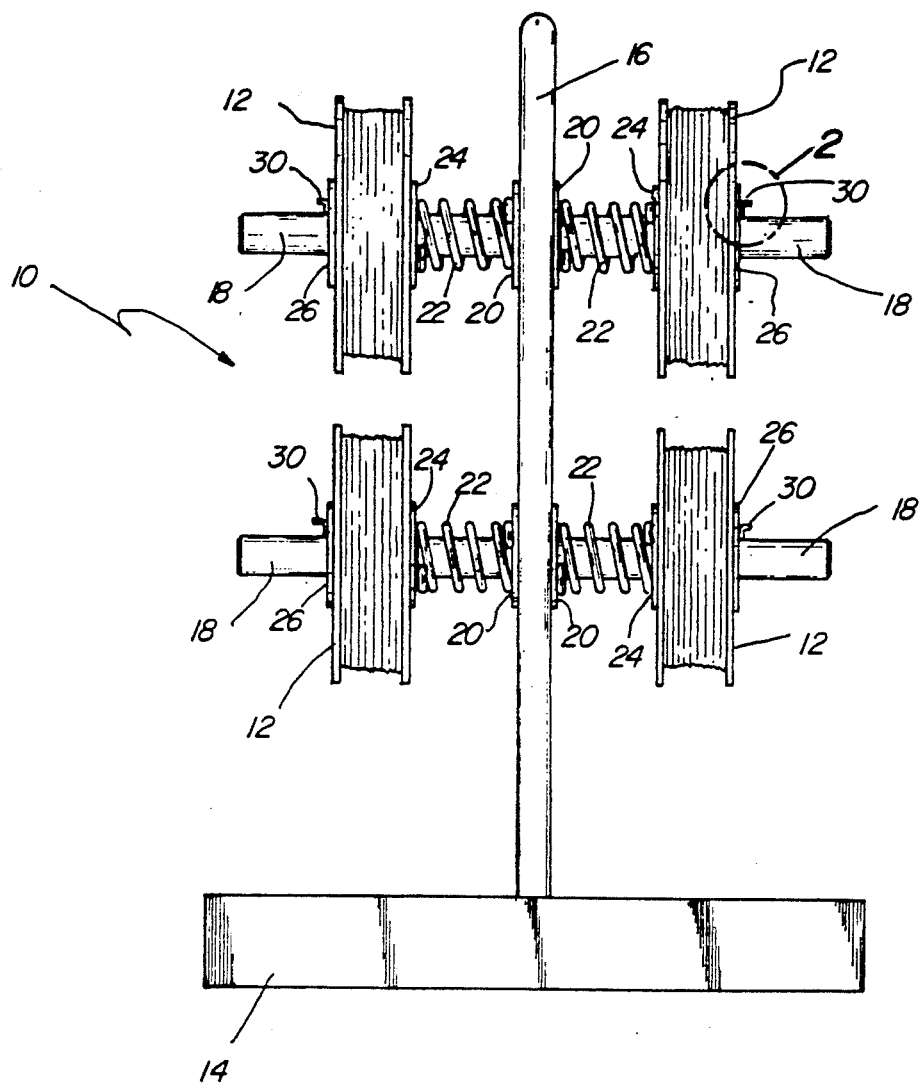
FIG. 1 is a view in elevation of the fishing line spool holder according to the present invention.
Figure 2:
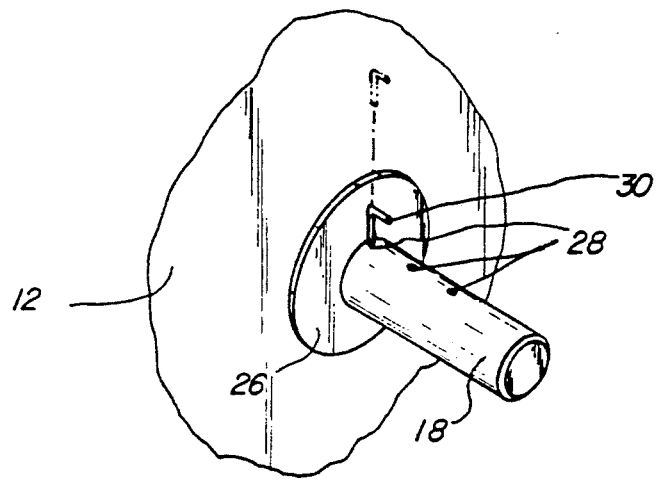
FIG. 2 is an enlarged perspective view of a portion of the holder of FIG. 1.

Turning initially to FIGS. 1 and 2 there is shown a first exemplary embodiment of the invention comprising a holder generally represented by reference numeral 10 for a multiplicity of conventional fishing line spools 12. In accordance with the invention, the holder 10 is adapted to securely support the spools 12 for individual selective rotation thereof about an axis extending through and defined by the central recess or hole in each spool. Thus, in FIG. 1, the axis of rotation for each spool is parallel to the plane of the illustration. In this manner, fishing line stored on any of the spools may be unwound therefrom by attaching the free end of the line on a particular selected spool in a suitable well known manner to the reel on a fishing rod or the like and simply rotating the fishing rod reel crank to transfer a predetermined length of fishing line from the selected spool.

Figure 6:
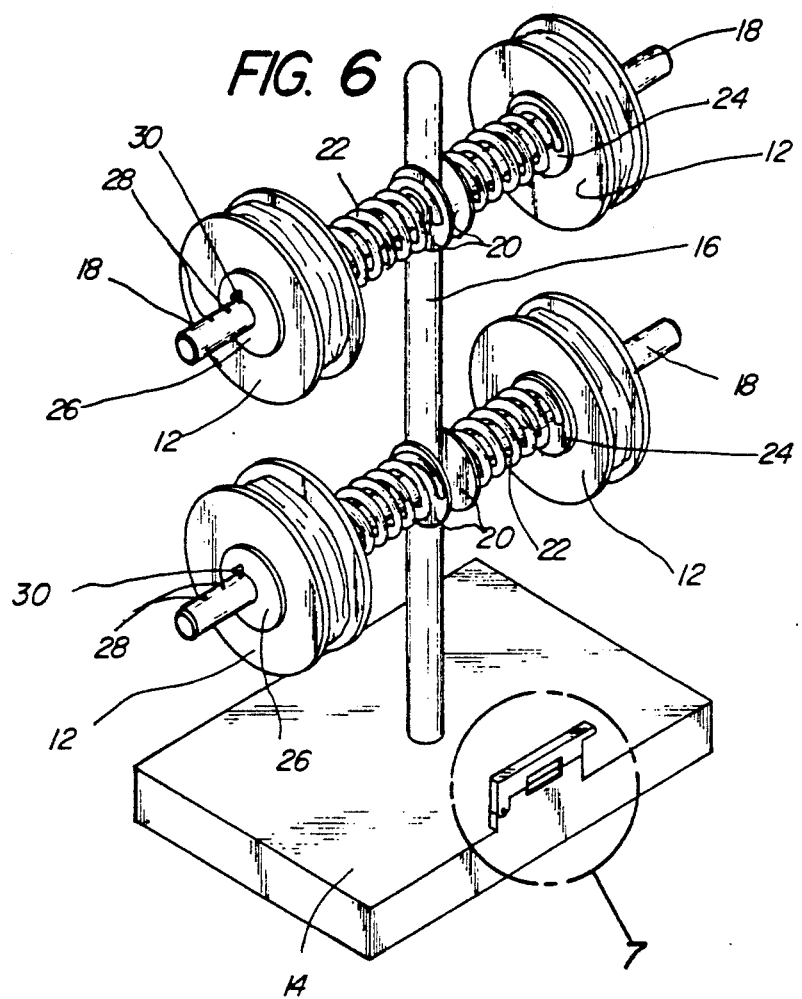
FIG. 6 is a perspective view in elevation of an alternatively preferred embodiment of the spool holder of the invention.

Holder 10 comprises a base member 14, preferably rectangular in shape (see also FIGS. 6 and 8), having a post 16 suitably securely affixed thereto and extending upwardly therefrom substantially as shown. Post 16 preferably is cylindrically shaped, but may as well have a rectangular, square, hexagonal, or elliptical cross-sectional shape since the purpose of post 16 is to support a multiplicity of transversely extending cylindrically shaped rods 18 upon which spools 12 may be mounted for rotation. Thus, each cylindrical rod 18 is sized (i.e. has a diameter) enabling it to be received within the central recess of a conventional fishing line spool with sufficient clearance to permit the spool to freely rotate on the rod 18 which thus serves as a fixed rotation shaft for the spool.

In accordance with an important feature of the invention, each rod 18 has cooperatively associated therewith means for regulating the resistance to rotation of each spool within a predetermined range and for maintaining each spool securely mounted on the rod as it rotates thereon. Such means comprise a first donut shaped washer 20 having a central recess slightly larger than the outside diameter of rod 18 positioned on rod 18 at the location where rod 18 is joined to post 16. Washer 20 serves as a bearing support for one end of a spiral compression spring 22 mounted on rod 18 and engaging washer 20 substantially as depicted. The other or distal end of spiral spring 22 engages a second donut shaped washer 24, which may be identical to washer 20, and which, in turn engages the inner sheaf of spool 12. A third washer 26, which may be identical to donut shaped washers 20,24 is mounted over the distal end of rod 18 and engages the outer sheaf of spool 12. As best seen in FIG. 2, rod 18 has a series of radial recesses or holes 28 longitudinally spaced along the rod and suitably formed therein to receive an L-shaped locking pin 30. The recesses 28 are suitably situated along the longitudinal extent of rod 18 so that when locking pin 30 is inserted into any one of the recesses 28, the locking pin will maintain washer 26 in engagement with spool 12 against the compressive force of spiral compression spring 22 via the constraining action of second washer 24 and first washer 20 abutting against post 16 while the spool rotates about its axis on rod 18. Of course, it will be apparent that the compressive force generated by spring 22 against spool 12 via washers 24,26 and locking pin 30, will depend upon the degree of compression of the spring 22, which, in turn, may be varied by selecting different ones of the recesses 28 into which the locking pin is inserted. Thus, by inserting the locking pin in a recess in rod 18 that is further away from post 16, the compression of spring 22 will be lessened and consequently, the frictional force applied against spool 12 as it rotates will be lessened. Similarly, the compressive force against the spool may be increased by displacing the spool on rod 18 toward the post 16 against the resilient compressive force of spring 22 and inserting the locking pin in a recess that is longitudinally nearer to post 16. By this action, the resistance to rotation of spool 12 on rod or shaft 18 produced by the coaction of spring 22, washers 20,24,26, locking pin 30 and recesses 28, as the spool rotates, i.e. the "drag" on the spool, may selectively be adjusted over a relatively wide range determined by the longitudinal spacing of the recess 28 along rod 18. This enables a user to dial in the correct tension in the fishing line being unwound from spool 12 by merely selecting the appropriate recess 28 for locking pin 30 after a spool has been mounted on rod 18 between washers 24,26.

Figure 3:
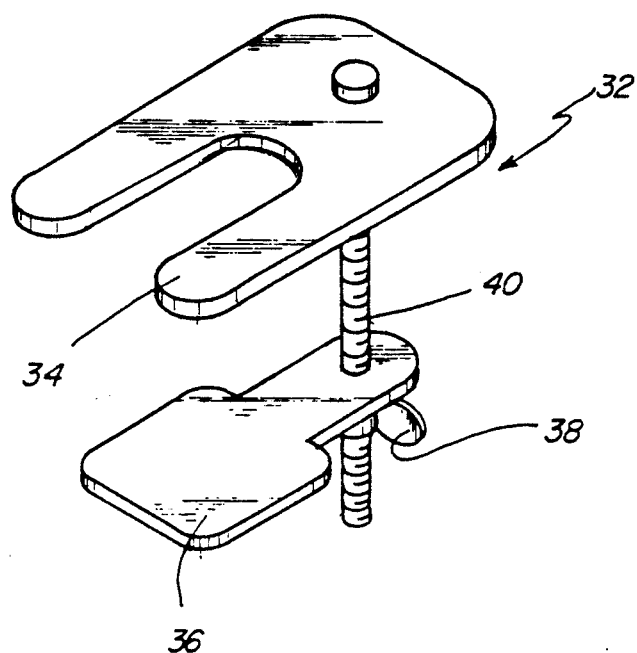
FIG. 3 is a perspective view of a clamp used to attach the holder of FIG. 1 to a support surface.
Figure 4:
FIG. 4 is a plan view of a suction cup used to alternatively attach the holder of FIG. 1 to a support surface.
Figure 5:
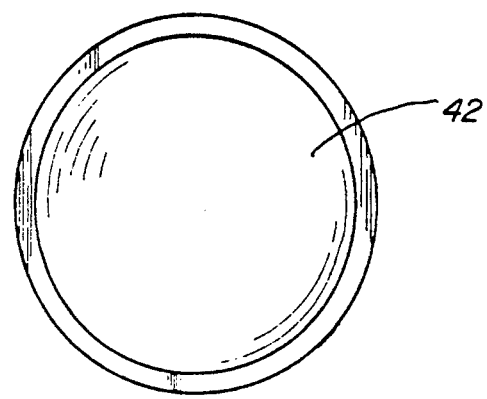
FIG. 5 is a plan view of the bottom of the suction cup of FIG. 4.

In operating the holder 10 of the invention, it is important to maintain the holder firmly and securely fixed during unwinding of fishing line from one of the spools mounted thereon. Turning to FIG. 3, this may be facilitated by attaching base 14 to a suitable flat surface such as a table top, for example, by means of a clamp 32 having a pair of jaws 34,36 adapted to be tightened relative to each other via the action of a conventional wing-nut 38 on a screw-threaded coupling shaft 40. Alternatively, and as shown in FIGS. 4 and 5, a conventional suction cup 42, or multiplicity of such suction cups may be suitably attached to the bottom of base 14 and used in a conventional manner to removably fix holder 10 to a work surface sufficient to securely support the holder and maintain spools 12 under appropriate reeling tension as the fishing line thereon is transferred from a spool to a fishing reel or the like.

Although the exemplary embodiment of FIGS. 1 and 2 includes four (4) rods, it will be understood that more or less rods may be provided on post 16 as dictated by the needs of the user. Moreover, it will be appreciated that more than one spool may be mounted on any one of the rods 18. In accordance with the invention, the provision of a multiplicity of rods, or a multiplicity of spool rotation stations enables a single holder 10 to support a wide variety of spools each having a different strength or pound-test rating. This convenient arrangement enabling the user to select the appropriate fishing line from a wide choice is yet another advantage of the present invention.

Figure 7:
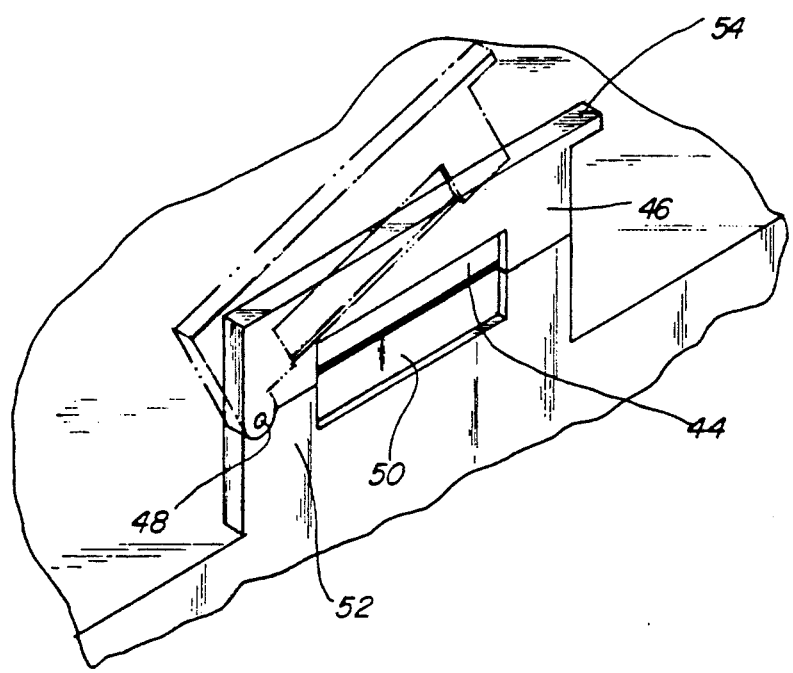
FIG. 7 is an enlarged perspective view of a portion of the holder of FIG. 6.

After a predetermined length of fishing line has been unwound from a spool 12 on holder 10 to a fishing reel, the line ordinarily will be cut leaving additional line on the spool. In order to facilitate cutting of the line, a line cutting means may be provided as shown in the exemplary embodiment of FIGS. 6 and 7 wherein like parts are represented by like reference numerals.

As shown therein, a cutting blade 44 is provided fixedly mounted on a protective arm 46 which in turn is pivotally attached at end via hinge 48 to a lower blade support member 50 carried in a holder 52 attached to base member 14. A finger tab 54 is provided at the end of the blade arm opposite hinge 48 to facilitate lifting blade arm and therefore blade 44 away from blade support 50 via hinge 48. In use, after a predetermined length of fishing line has been unwound from a particular spool 12, the line is brought between blade 44 and blade holder 50 by lifting arm 46. The line next is cut by pressing the blade arm downwardly against the line and holder 50. The line cutting means contemplated herein thus provides an additional convenience to the user.

Figure 8:
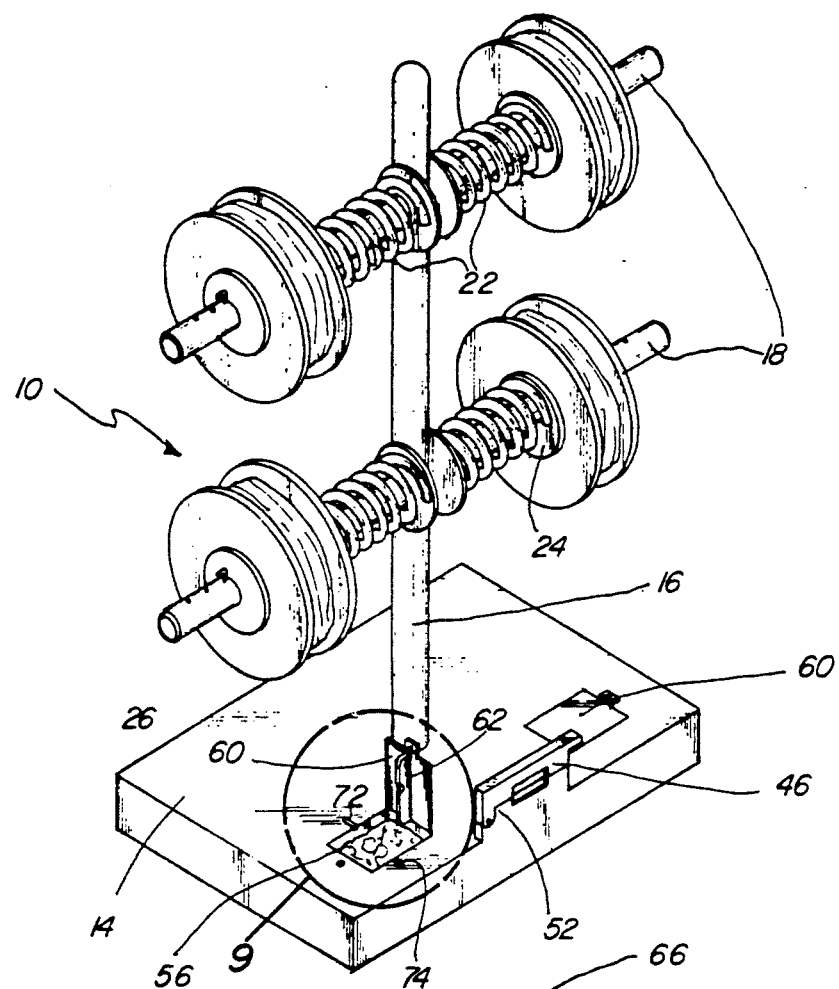
FIG. 8 is a perspective view in elevation of yet an another alternative preferred embodiment of the multiple spool holder of the invention.
Figure 9:
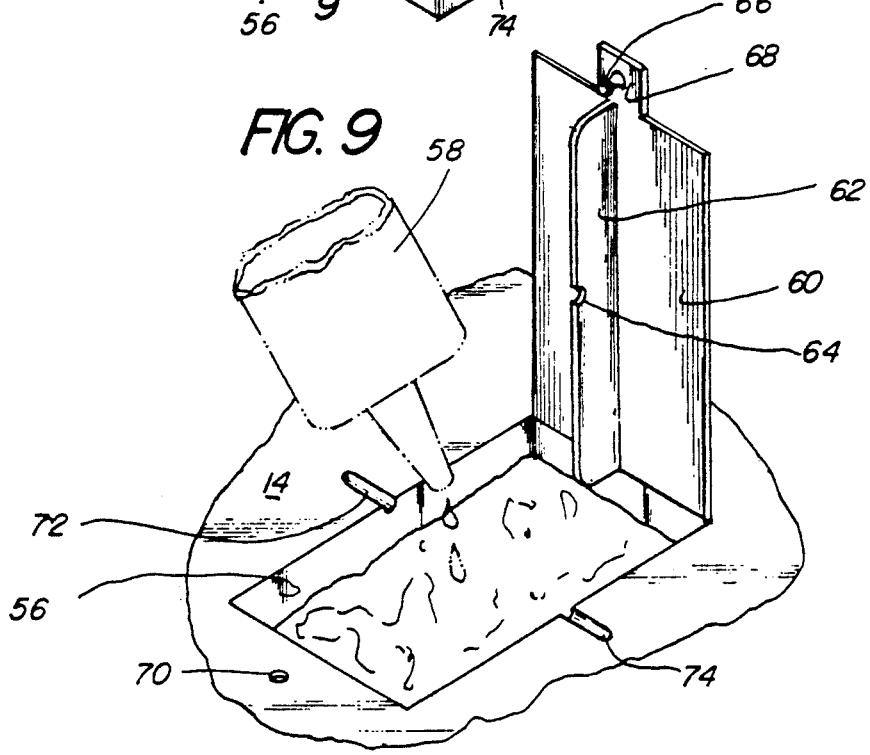
FIG. 9 is an enlarged perspective view of a portion of the holder of FIG. 8.

The invention provides yet another convenient feature in the form of the fishing line "scent" applicator shown in the exemplary embodiment of FIGS. 8 and 9 where, once again, like numerals represent like parts as already described. The fish scent applicator of the present invention comprises a rectangular recess 56 disposed in the upwardly facing surface of base 14 which serves as a tray for receiving a conventional commercially available "fish scent" furnished in liquid form by a dispenser 58. A cover 60 hinged at one side of recess 56 carries a longitudinal strut 62 having a cut-out 64 disposed centrally therein substantially as shown. A detent 66 on extension 68 of cover 60 is adapted to be received in recess 70 in the surface of base 14 and maintain the cover in the closed position. A pair of opposed grooves 72,74 formed in the surface of base 14 adjacent each longitudinal side of recess 56 line up with the cut-out 64 in strut 62 when cover 60 is in the down or closed position. In use, applicator recess 56 is filled with conventional liquid "fish scent" via dispenser 58 and fishing line from a spool 12 on holder 10 is trained through grooves 72,74. The cover 60 then is closed with the cut-out 64 engaging the trained fishing line. As the fishing line is unwound from a spool, the line passes through grooves 72,74, and cut-out 64 (cover 60 is closed) and thereby through the pool of liquid "fish scent" reposing in recess 56. Thus, the "fish scent" stored in recess 56 is automatically applied to the fishing line and coats the fishing line as it is unwound and transferred to a fishing reel. After a predetermined length of fishing line has been so treated, cover 60 may be raised by suitably manipulating extension 68 and the fishing line transferred to the line cutter to be severed. As shown in FIG. 8, more than one "fish scent" applicator station may be situated on base 14.

In summary, it is apparent from the above description that the present invention contemplates a new and improved holder for fishing line spools wherein unique means are provided for adjusting over a predetermined range the resistance to rotation of each spool as it rotates and thereafter for selecting the tension in the fishing line as it is unwound from a spool and transferred to a reel or the like. Also provided are means for cutting the line after a predetermined length and for automatically applying "fish scent" to the line as it is unwound. The combination of these features as fully disclosed and claimed herein thus provides an extremely compact, convenient, and advantageous fishing line spool holder.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

While the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing form the principles and concepts set forth. Hence, the proper scope of the present invention should be determined only by the broadest interpretation of the appended claims so as to encompass all such modifications and equivalents.

What is claimed as being new and desired to be protected by Letters Patent of the United States is as follows:

1. A fishing line spool holder comprising:
   a base member, a post member, said post member being mounted on said base member in an upstanding relation to said base member, first and second rod members mounted on said post member and extending oppositely with respect to each other in an orthogonal direction relative to said post member, each of said first and second rod members having an end proximal to said post member and a free end extending distally with respect to said post member, each of said first and second rod members further including:

rotatable spool means mounted for rotation thereon, a fishing line wound on said spool means, compression means mounted between said end proximal to said post member and said rotatable spool means, and releasable locking means located on said rod between said spool means and said distally extending free end, and wherein said locking means includes means for maintaining said spool means in one of a plurality of axial positions on said rod between said compression means and said locking means such that said compression means is effective to retard the rotation of said spool means on said rod in varying extent depending upon the axial position of said spool means as determined by said locking means, and wherein said means for maintaining said spool means in one of a plurality of axial positions comprises a series of axially spaced holes extending through said rod in an orthogonal direction with respect to the axial extent of said rod, and said locking means comprises a pin member selectively insertable in one of said holes in a position engageable with said spool means whereby said spool means is maintained in abutting fixed engagement with said pin member by said compression means.

2. The apparatus of claim 1 further comprising third and fourth rod members mounted on said post member and extending oppositely with respect to each other in an orthogonal direction relative to said post member, each of said third and fourth rod members having an end proximal to said post member and a free end extending distally with respect to said post member, said third and fourth rod members being spaced from said first and second rod members in a direction along said post member, each of said third and fourth rod members further including:

spool means mounted for rotation thereon, a fishing line wound on said spool means, compression means mounted between said end proximal to said post member and said rotatable spool means, and releasable locking means located on said rod between said spool means and said distally extending free end, and wherein said locking means includes means for maintaining said spool means in one of a plurality of axial positions on said rod between said compression means and said locking means such that said compression means is effective to retard the speed of rotation of said spool means on said rod in varying extent depending upon the axial position of said spool means as determined by said locking means, and wherein said means for maintaining said spool means in one of a plurality of axial positions comprises a series of axially spaced holes extending through said rod in an orthogonal direction with respect to the axial extent of said rod, and said locking means comprises a pin member selectively insertable in one of said holes in a position engageable with said spool means whereby said spool means is maintained in abutting fixed engagement with said pin member by said compression means.

* * * * *